(12) United States Patent
Viorel et al.

(10) Patent No.: US 9,572,123 B2
(45) Date of Patent: Feb. 14, 2017

(54) MULTIPLE TIME ADVANCE FOR RADIO ACCESS NETWORKS

(75) Inventors: Dorin Viorel, Calgary (CA); Chenxi Zhu, Fairfax, VA (US)

(73) Assignee: FUJITSU LIMITED, Kawasaki (JP)

( * ) Notice: Subject to any disclaimer, the term of this patent is extended or adjusted under 35 U.S.C. 154(b) by 484 days.

(21) Appl. No.: 13/420,445

(22) Filed: Mar. 14, 2012

(65) Prior Publication Data
US 2013/0244640 A1    Sep. 19, 2013

(51) Int. Cl.
*H04W 4/00* (2009.01)
*H04W 56/00* (2009.01)
*H04L 5/00* (2006.01)
*H04L 5/14* (2006.01)

(52) U.S. Cl.
CPC ..... *H04W 56/0045* (2013.01); *H04W 56/0005* (2013.01); *H04W 56/0015* (2013.01); *H04L 5/0035* (2013.01); *H04L 5/1469* (2013.01)

(58) Field of Classification Search
None
See application file for complete search history.

(56) References Cited

U.S. PATENT DOCUMENTS

| 6,667,963 | B1 * | 12/2003 | Rantalainen | H04J 3/0682 370/337 |
| 8,380,240 | B2 * | 2/2013 | Muharemovic | H04W 56/0045 370/345 |
| 2008/0318573 | A1 | 12/2008 | Kaminski et al. | |
| 2009/0318175 | A1 | 12/2009 | Sandberg | |
| 2010/0120397 | A1 | 5/2010 | Kazmi et al. | |
| 2011/0110251 | A1 * | 5/2011 | Krishnamurthy | H04W 72/082 370/252 |
| 2011/0170535 | A1 | 7/2011 | Wang et al. | |
| 2012/0087270 | A1 * | 4/2012 | Wan | H04W 56/0045 370/252 |
| 2012/0120821 | A1 * | 5/2012 | Kazmi et al. | 370/252 |
| 2012/0149428 | A1 * | 6/2012 | Yang | 455/524 |
| 2012/0258752 | A1 * | 10/2012 | Liao | 455/509 |
| 2013/0194942 | A1 * | 8/2013 | Hu | G01S 5/04 370/252 |

(Continued)

FOREIGN PATENT DOCUMENTS

| EP | 2 410 669 A1 | 1/2012 |
| WO | 2011/075867 A1 | 6/2011 |

OTHER PUBLICATIONS

Fujitsu Networks Communications Inc: "4G Impacts to Mobile Backhaul", Jun. 2010.

(Continued)

*Primary Examiner* — German J Viana Di Prisco
(74) *Attorney, Agent, or Firm* — Maschoff Brennan

(57) ABSTRACT

In an example embodiment, a system may include a mobile terminal. The mobile terminal may be configured to receive a first signal including a first time advance value. The first signal may be transmitted by a first base station. The mobile terminal may be further configured to receive a second signal. The second signal may be transmitted by a second base station. The mobile base station may be further configured to determine a difference in propagation delay between the first and second signals. The mobile terminal may be further configured to determine a second time advance value by correlating the first time advance value with the difference in propagation delay.

20 Claims, 7 Drawing Sheets

(56) References Cited

U.S. PATENT DOCUMENTS

2013/0250925 A1\* 9/2013 Lohr ................. H04W 56/0045
 370/336
2015/0003305 A1\* 1/2015 Park et al. .................... 370/280

OTHER PUBLICATIONS

3GPP 36.819: "Technical Specification Group Radio Access Network; Coordinated multi-point operation for LTE physical layer aspects (Release 11)" Sep. 2011.
3GPP 36.211:"Technical Specification Group Radio Access Network; Evolved Universal Terrestrial Radio Access (E-UTRA); Physical Channels and Modulation (Release 10)" Dec. 2011.
3GPP 36.212: "Technical Specification Group Radio Access Network; Evolved Universal Terrestrial Radio Access (E-UTRA); Multiplexing and channel coding (Release 10)" Dec. 2011.
3GPP 36.213: "Technical Specification Group Radio Access Network; Evolved Universal Terrestrial Radio Access (E-UTRA); Physical layer procedures (Release 10)" Dec. 2011.
3GPP 36.321: "Technical Specification Group Radio Access Network; Evolved Universal Terrestrial Radio Access (E-UTRA); Medium Access Control (MAC) protocol specification (Release 10)" Dec. 2011.
International Search Report and Written Opinion dated May 17, 2013 in application No. PCT/US2013/030271.

\* cited by examiner

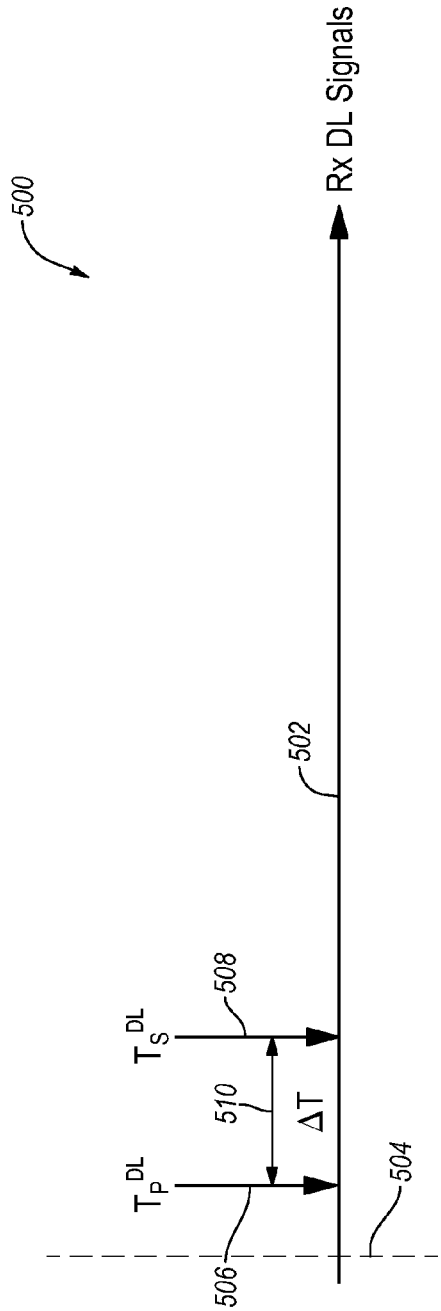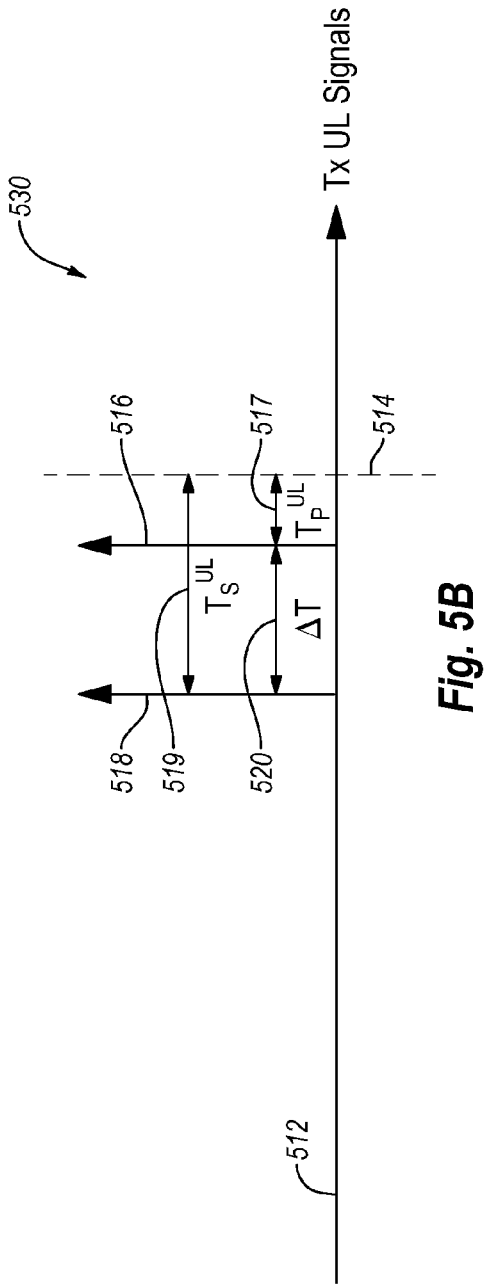
Fig. 5A
Fig. 5B

MULTIPLE TIME ADVANCE FOR RADIO ACCESS NETWORKS

FIELD

The embodiments discussed herein are related to wireless communication systems.

BACKGROUND

The increasing amounts of signal transmissions sent over radio access networks is acting to degrade the experience of the radio access network's end-users by increasing latency and lowering individual throughput. Some methods to avoid or at least decrease the degradation experienced by end-users of radio access networks have been developed. Some of these methods may include but are not limited to coordinated multipoint (CoMP) downlink (DL) joint transmission (JT), CoMP uplink (UL) joint reception (JR), DL load balancing, and UL load balancing. Methods such as ULJR, UL offloading and others may include transmitting UL transmissions from mobile terminals to multiple neighboring base stations. When a UL transmission is sent to multiple neighboring base stations, each of the multiple neighboring base stations may receive and/or process a portion of or all of the overall UL transmission.

In some circumstances, a base station of a radio access network may have a scheduled time window for receiving UL transmissions from a mobile terminal. Because of propagation delays of the UL transmissions, resulting from the UL transmissions traveling over a physical distance, mobile terminals may transmit the UL transmissions in advance of the scheduled time window such that the UL transmissions arrives at the base station during the scheduled time window. In some circumstances, time advance information may be transmitted from the base station to the mobile terminal and the mobile terminal may advance the UL transmissions accordingly, from the mobile terminal by a time advance value to compensate for propagation delays.

Circumstances where UL transmissions are sent to multiple neighboring base stations from a mobile terminal may pose a challenge because the mobile terminal may be expected to simultaneously accommodate a different time advance for each neighboring base station that receives a UL transmission. For example, a mobile terminal may be closer propagation-channel-wise to a first base station than a second base station as the mobile terminal transmits a UL transmission to both base stations. If the UL transmission is time advanced for the first base station, the portion of the UL transmission received by the second base station may not arrive at the second base station within its scheduled time window.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system may include a mobile terminal. The mobile terminal may be configured to receive a first signal including a first time advance value. The first signal may be transmitted from a first base station. The mobile terminal may be further configured to receive a second signal. The second signal may be transmitted from a second base station. The mobile base station may be further configured to determine a difference in propagation delay between the first and second signals. The mobile terminal may be further configured to determine a second time advance value by correlating the first time advance value with the difference in propagation delay.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 5A and 5B illustrates example timelines for receiving and transmitting transmissions at a mobile terminal;

DESCRIPTION OF EMBODIMENTS

Some embodiments are herein described in relation to a communication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example communication systems described. Rather, the embodiments described herein may be applicable to other communication systems.

In particular, some embodiments described herein may relate to coordinating scheduling for UL transmissions sent to multiple base stations from a mobile terminal. For example, in some embodiments, a mobile terminal may be configured to receive first and second signals transmitted from first and second base stations respectively. In some embodiments, the first signal may include a first time advance value for coordinating scheduling for UL transmissions between the mobile terminal and the first base station. The mobile terminal may further be configured to determine a second time advance value for coordinating scheduling for UL transmissions between the mobile terminal and the second base station. The second time advance value may be determined by correlating the first time advance value with a propagation delay difference between the first signal and the second signal.

Embodiments will be explained with reference to the accompanying drawings.

Figure 1:
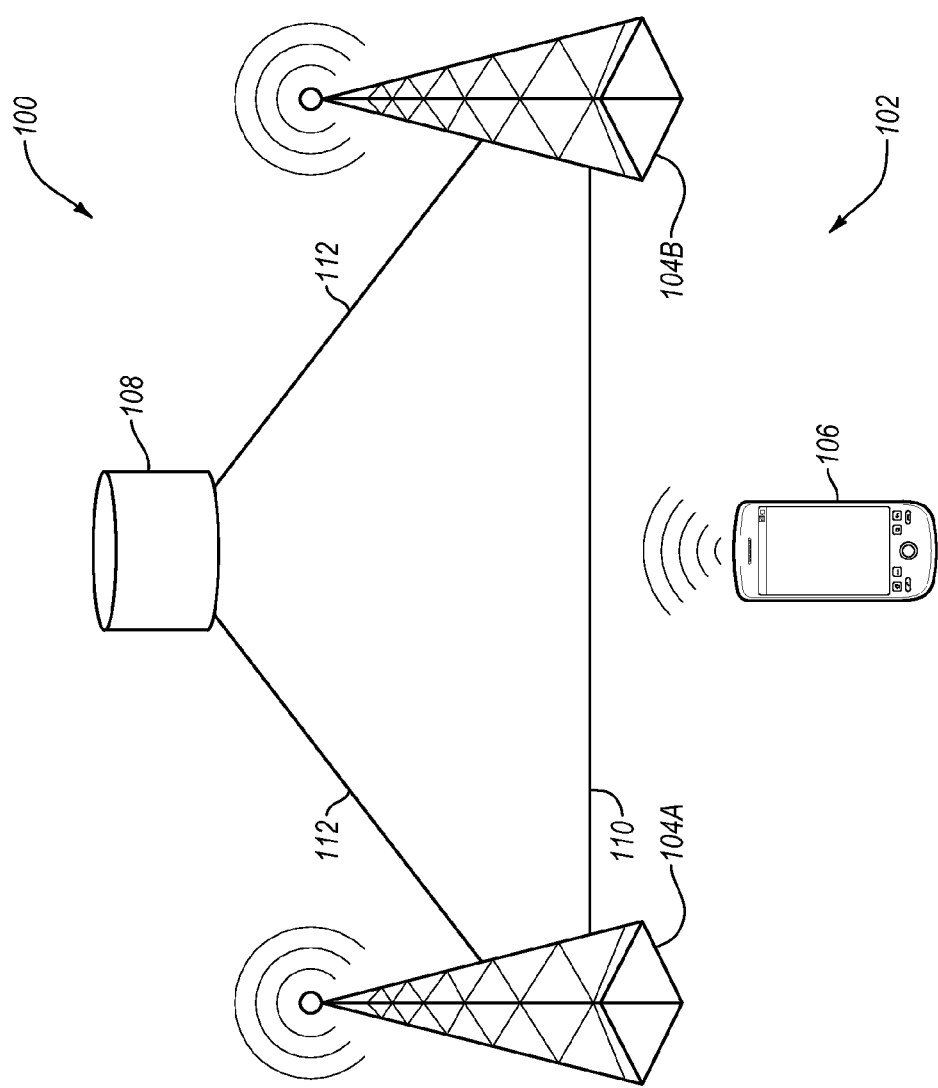
FIG. 1 illustrates an example network architecture of a mobile telecommunication system.

FIG. 1 illustrates an example network architecture of a mobile telecommunication system 100, arranged in accordance with at least some embodiments described herein. In some embodiments, the network architecture may include the network architecture of an Evolved Universal Mobile Telecommunications System (E-UMTS) that may include an LTE radio access network or some other type of system with an LTE radio access network or other type of network.

The mobile telecommunication system 100 may include a radio access network 102. The radio access network 102 may include base stations 104A, 104B (collectively "base stations 104"), a mobile terminal 106, and a base station communication interface 110 that couples the base stations 104. In some embodiments, the radio access network may include an Evolved UMTS (Universal Mobile Telecommunications System) Terrestrial Radio Access Network (eU-TRAN) or some other network or system.

The base stations 104 may include base station equipment, including, for example, hardware and/or software configured to enable communications between the base stations 104 and the mobile terminal 106, other base stations, or a core network 108. Each base station 104 may also include one or more antenna for transmitting (Tx) and receiving (Rx) radio transmissions. In some embodiments, using the one or more antenna, each of the base stations 104 may provide radio access for an area of land known as a cell.

Although only two base stations 104 are shown in FIG. 1, the radio access network 102 may include additional base stations, for example, to provide radio access to a large geographic area. In some embodiments, the base stations 104 may include one or more Evolved Node B (eNodeB) logical nodes, for example, as part of an LTE network.

The base station communication interface 110 may be configured to allow the base stations 104 to communicate with one another. In some embodiments, the base station communication interface 110 may include a hardwired communication interface. In some embodiments, the base station communication interface 110 may include an X2 interface, for example, as part of an LTE network or some other type of applicable interface.

The mobile telecommunication system 100 may also include a core network communication interface 112 that may be configured to allow the base stations 104 to communicate with the core network 108. In some embodiments, the core network communication interface 112 may include a hardwired communication interface. In some embodiments, the core network communication interface 112 may include an S1 interface, for example, as part of an LTE network or some other type of applicable interface.

The mobile terminal 106 may include equipment configured to allow the mobile terminal 106 to transmit and receive data via the mobile telecommunication system 100. For example, the mobile terminal 106 may include hardware, such as one or more antennas for transmitting and receiving radio transmissions, codecs, and/or processors, and/or software configured to enable radio communications between the mobile terminal 106 and the base stations 104. The mobile terminal 106 may be a mobile phone, tablet computer, laptop computer, or other electronic device that uses radio communication. Alternately or additionally, the mobile terminal 106 may include terminals that employ machine-type communication (MTC).

In some embodiments, the base station 104A may schedule receiving windows for receiving UL transmissions from the mobile terminal 106. Receiving windows may include precise periods of time reserved specifically for receiving UL transmissions from the mobile terminal 106 at the base station 104A. In some circumstances, the mobile terminal 106 may be located a distance away from the base station 104A such that UL transmissions transmitted by the mobile terminal 106 at the scheduled receiving window arrive at the base station 104A at least partially outside of the scheduled receiving windows due to propagation delays of the UL transmissions. In some circumstances, UL transmissions that arrive outside of a scheduled receiving window may not be properly received by the base station 104A and/or may cause interference with other transmissions received at the base station 104A. In some embodiments, to assist in preventing a part or a whole of UL transmissions from arriving outside the scheduled receiving window of the base station 104A, the mobile terminal 106 may transmit UL transmissions ahead of the scheduled receiving windows by a time advance value. The time advance value may indicate to the mobile terminal 106 the amount of time before the scheduled receiving window that the mobile terminal 106 may transmit a UL transmission to compensate for the propagation delay of the UL transmissions. In these and other embodiments, the base station 104A may determine the time advance value and transmit the time advance value to the mobile terminal 106. In other embodiments, the mobile terminal 106 may determine the time advance value based on signals received from the base station 104A, signals from other base stations, such as base station 104B, and/or other information.

Figure 2:
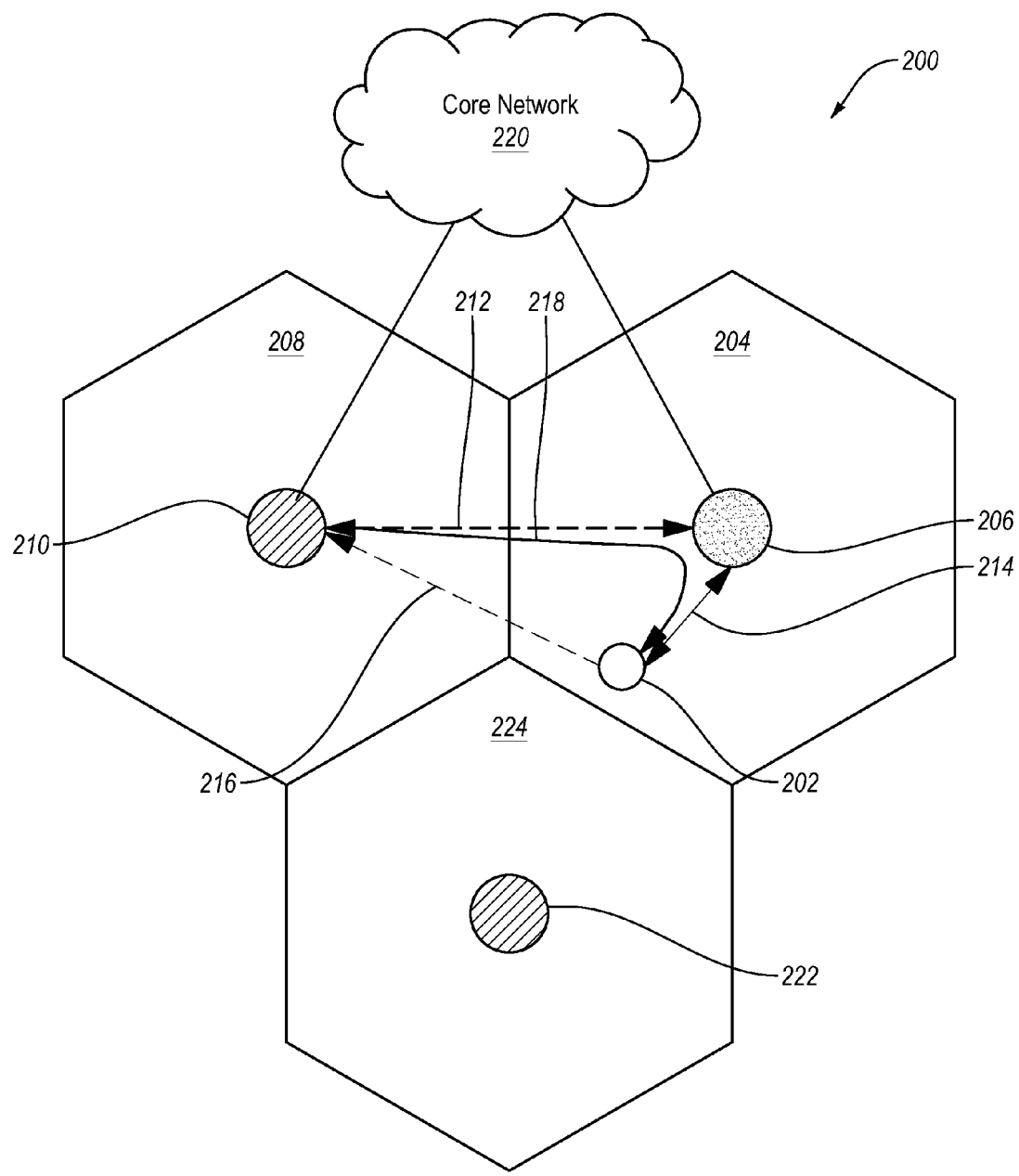
FIG. 2 illustrates an example radio access network.

FIG. 2 illustrates an example radio access network 200, arranged in accordance with at least some embodiments described herein. The radio access network 200 may include a mobile terminal 202. In some embodiments, the mobile terminal 202 may be located within a primary cell 204 associated with a primary base station 206.

In addition, although not shown, other mobile terminals may be communicating over the radio access network 200 via the primary base station 206. The mobile terminal 202 and other mobile terminals communicating over the radio access network 200 via the primary base station 206 may have varying traffic requirements. In some circumstances, due to the other mobile terminals communicating with the primary base station 206, the mobile terminal 202 may experience increased latency and/or lower throughput when transmitting and/or receiving data via the primary base station 206. For example, the mobile terminal 202 may experience increased latency and/or lower throughput when the mobile terminal 202 and other mobile terminals using the primary base station 206 transmit and/or receive data via the radio access network 200 experiencing high traffic.

When the mobile terminal 202 begins to experience increased latency and/or lower throughput, under other circumstances, such as the mobile terminal 202 receiving an indication of traffic at the primary base station 206, or under normal operating conditions, the mobile terminal 202 may be configured to search for neighboring base stations, to identify other base stations that may work with the primary base station 206 to accommodate the traffic requirements of the mobile terminal 202. For example, in some embodiments, when the mobile terminal 202 begins searching for neighboring base stations, the mobile terminal 202 may detect a secondary base station 210 associated with a secondary cell 208.

After detecting the secondary base station 210, the mobile terminal 202 may determine whether conditions of a physical layer between the secondary base station 210 and the mobile terminal 202 allow for communications between the secondary base station 210 and the mobile terminal 202. For example, the mobile terminal 202 may determine if a signal to noise ratio or signal to interference ratio of signals transmitted between the secondary base station 210 and the mobile terminal 202 are within an acceptable range. The mobile terminal 202 may communicate to the primary base station 206 the capability of the secondary base station 210 to receive UL transmissions from the mobile terminal 202. In some embodiments, the primary base station 206 may communicate this capability to a core network 220. Other secondary base stations and their corresponding cells may be included in the radio access network 200. For example, in some embodiments, the radio access network 200 may include a tertiary base station 222 in a tertiary cell 224. In some embodiments, the radio access network 200 may include clusters of cells comprising more than three base stations and three cells.

Under some circumstances, the UL traffic loads experienced by the primary base station 206 due to communications with the mobile terminal 202 and other mobile terminals may be such that the primary base station 206 may decide to offload part of the UL traffic from the mobile terminal 202 to the secondary base station 210. For example, when the UL traffic loads reach and/or exceed a predetermined threshold, the primary base station 206 may decide to offload part of the UL traffic from the mobile terminal 202 to secondary base station 210. Offloading part of the UL traffic from the mobile terminal 202 to the secondary base station 210 may include having the mobile terminal 202 send traffic, such as UL transmissions, to the secondary base station 210.

To offload the traffic, the primary base station 206 may initiate UL load balancing with the secondary base station 210. In some embodiments, initiating UL load balancing may prompt the secondary base station 210 to schedule resources to receive UL transmissions from the mobile terminal 202. In some embodiments, initiating UL load balancing may include determining a ratio of the total UL transmissions transmitted by the mobile terminal 202 that are received at the primary base station 206 and a ratio of the total UL transmissions transmitted by the mobile terminal 202 that are received at the secondary base station 210. In some embodiments, the UL load balancing may be initiated through the core network 220. In these and other embodiments, the primary base station 206 may send a request for UL load balancing with the secondary base station 210 to the core network 220. The core network 220 may coordinate the UL load balancing between the primary and secondary base stations 206, 210. Alternately or additionally, the UL load balancing may be initiated through a base station communication interface 212 that allows for communication between base stations within the radio access network 200, such as between the primary and secondary base stations 206, 210. In these and other embodiments, the primary base station 206 may send a request for a UL load balancing directly to the secondary base station 210 using the base station communication interface 212, under the supervision of the core network 220.

In some embodiments, the primary base station 206 and the secondary base station 210 performing UL load balancing may cause the primary base station 206 and/or secondary base station 210 to schedule one or more receiving windows for receiving UL transmissions from the mobile terminal 202.

As noted earlier, because of the propagation delay of UL transmissions transmitted between the mobile terminal 202 and the primary and/or secondary base stations 206, 210, the mobile terminal 202 may transmit UL transmissions earlier than a scheduled receiving window based on a time advanced value to reduce the likelihood that the UL transmissions are received outside the scheduled receiving windows. In some embodiments, the primary base station 206 may transmit primary time advance information to the mobile terminal 202 over a primary radio interface 214. The primary time advance information may include a primary time advance value. The primary time advance value may represent the measure of time the mobile terminal 202 may advance UL transmissions transmitted to the primary base station 206 to account for the propagation delay between the mobile terminal 202 and the primary base station 206. Depending on the location of the mobile terminal 202 within the primary cell 204 however, a propagation delay for UL transmissions transmitted between the mobile terminal 202 and the primary base station 206 may be unequal to the propagation delay for UL transmissions transmitted between the mobile terminal 202 and the secondary base station 210. In these and other embodiments, UL transmissions transmitted over a secondary radio interface 216 that have been time advanced by the primary time advance value may arrive at the secondary base station 210 at least partially outside of the scheduled receiving windows of the secondary base station 210 due to the unequal propagation delays.

In some embodiments, a secondary time advance value may be determined for UL transmissions transmitted from the mobile terminal 202 to the secondary base station 210 to reduce the likelihood that the UL transmissions are received outside the scheduled receiving windows of the secondary base station 210. In some embodiments, the mobile terminal 202 may be configured to determine the secondary time advance. In these and other embodiments, to determine the secondary time advance, the mobile terminal 202 may be configured to determine a propagation delay difference between a first signal received from the primary base station 206 and a second signal received from the secondary base station 210. The mobile terminal 202 may be configured to correlate the propagation delay difference with the primary time advance value to determine the secondary time advance value. In these and other embodiments, when the mobile terminal 202 determines the secondary time advance value, no secondary time advance information may be received and processed by the mobile terminal 202, from the secondary base station 210 directly or indirectly through the primary base station 206 or another base station. Alternately or additionally, when the mobile terminal 202 determines the secondary time advance value, the mobile terminal 202 may not have initiated any control information exchange with the secondary base station 210. With the mobile terminal 202 not being connected to the secondary base station 210, the mobile terminal 202 may not receive time advance information from the secondary base station 210. The mobile terminal 202 may be connected to a base station when the mobile terminal 202 has completed a network entry procedure including a random access procedure with the base station. For example, the mobile terminal 202 may be connected to a primary base station 206 if, as a part of the network entry procedure, the primary base station 206 determines a time advance value for the mobile terminal 202 and transmits the time advance value to the mobile terminal 202.

In some embodiments, the primary and secondary time advance values may be used to facilitate UL load balancing among the primary and secondary base stations 206, 210. In these and other embodiments, the mobile terminal 202 may be configured to transmit and receive data packets with a primary base station 206 and possibly with one or more secondary base stations. The communication may include a first transmission to be received at the primary base station 206 during a first receiving window and a second transmission to be received at the secondary base station 210 during a second receiving window. The mobile terminal 202 may transmit the first transmission ahead of the first receiving window, referenced to the antenna port of the primary base station 206 by the first time advance such that the first transmission is received at the primary base station 206 during the first receiving window. The mobile terminal 202 may also transmit the second transmission ahead of the second receiving window, referenced at the antenna port of the secondary base station 210, by the second time advance such that the second transmission is received at the secondary base station 210 during the second receiving window.

In some embodiments, the radio access network 200 may include a tertiary base station 222 associated with a tertiary cell 224. In these and other embodiments, the mobile terminal 202 may located the tertiary base station 222 and send information about the tertiary base station 222 to the primary base station 206. The primary base station 206 may initiate UL load balancing with the tertiary base station 222, under the core network 220 supervision. In some embodiments, a third time advance value may be determined for UL transmissions transmitted from the mobile terminal 202 to the tertiary base station 222 to reduce the likelihood that the UL transmissions are received outside scheduled receiving windows of the tertiary base station 222. In these and other embodiments, to determine the third time advance value, the mobile terminal 202 may be configured to determine a propagation delay difference between a first signal received from the primary base station 206 and a third signal received from the tertiary base station 222. The mobile terminal 202 may be configured to correlate the propagation delay difference with the primary time advance value to determine the third time advance value.

In these and other embodiments, the communication transmitted by the mobile terminal 202 to the primary and secondary base stations 206, 210 may include a third transmission to be received at the tertiary base station 222 during a third receiving window. The mobile terminal 202 may transmit the third transmission ahead of the third receiving window by the third time advance, referenced at the antenna port of the tertiary base station 222, such that the third transmission is received at the tertiary base station 222 during the third receiving window.

In some embodiments, radio communications between the mobile terminal 202 and the base stations 206, 210, 222 may be based on Time Division Duplexing (TDD). TDD may employ the same frequency band for UL and DL by processing UL and DL transmissions separately into different periods of time. For example, in TDD, a first period of time may be scheduled for a mobile terminal to receive DL transmissions on a particular frequency band, and a second period of time may be scheduled for the mobile terminal to transmit UL transmissions on the same frequency band. In some embodiments, the order and/or ratio of periods scheduled for UL and DL transmission may depend on the use of communication structures defined by the radio access network.

Figure 3:
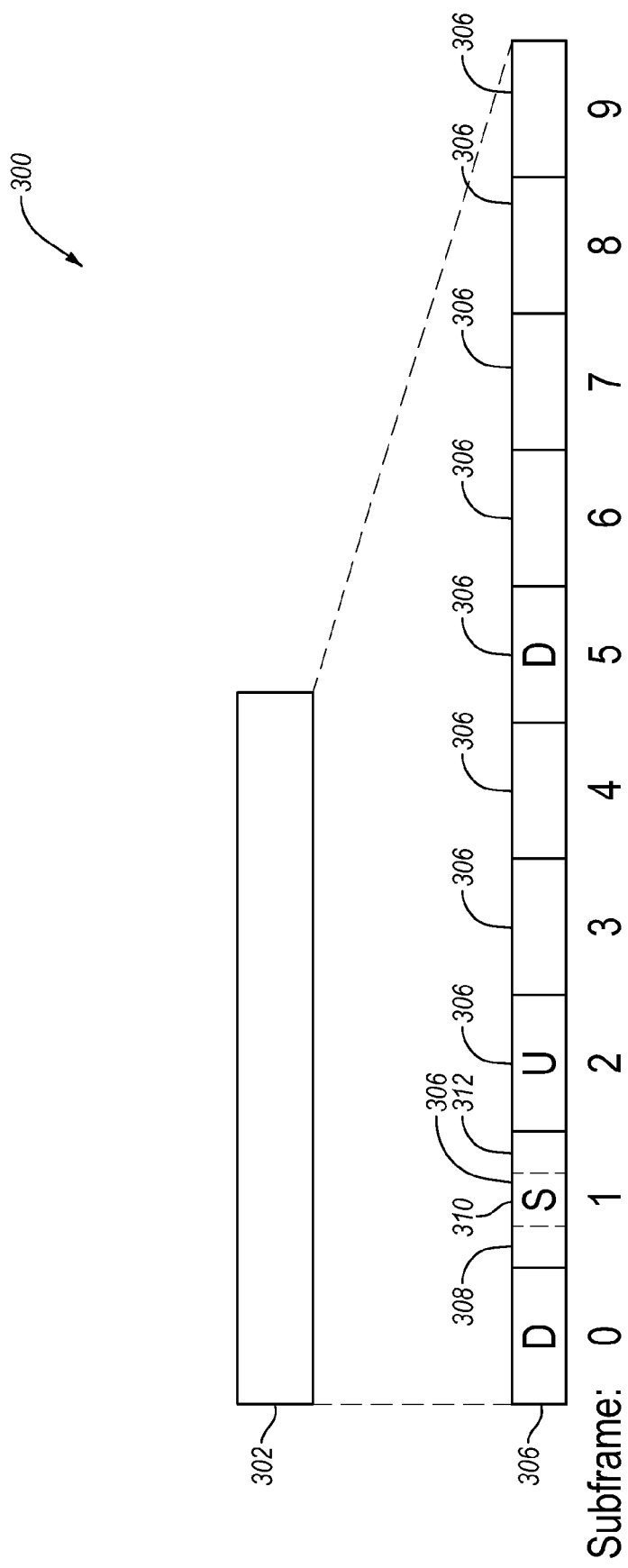
FIG. 3 illustrates an example communication protocol structure used in a radio access network employing Time Division Duplexing.

FIG. 3 illustrates an example communication protocol structure 300 used in a radio access network employing TDD, arranged in accordance with at least some embodiments described herein. In some embodiments, radio access networks employing TDD may employ the same or similar communication structures. In some embodiments, the radio access network in FIG. 3 may be a LTE radio access network.

The communication protocol structure 300 may include a radio frame 302 representing a particular period of time, for example, ten milliseconds. In these and other embodiments, the radio frame 302 may be divided into a total of ten subframes 306, each subframe 306 being approximately one millisecond in length. Although some embodiments are herein described in relation to the frame structure shown in FIG. 3, in some embodiments, other radio frames 302 and subframes 306, with different DL and UL assignations may be used. For example, in some embodiments, radio frames and subframes as set forth in the LTE 3GPP specifications may be used. Alternately or additionally, the radio frame 302 may have other lengths, more or fewer subframes 306, and/or varying subframe 306 lengths.

In some embodiments, the subframes 306 are assigned identifiers, for example, the subframes may be numbered 0 to 9. In some embodiments, the subframes 306 may be designated DL, UL, or special subframes. For example, as shown in FIG. 3, subframes 0 and 5 are designated as DL subframes (D), subframe 1 is designated as a special subframe (S), and subframe 2 is designated as a UL subframe (U). DL data may be transmitted from a base station to a mobile terminal during DL subframes. UL data may be transmitted from a mobile terminal to a base station during UL subframes. Special subframes (S) may be used when switching from DL transmission subframes to UL transmission subframes, for example, as demonstrated by subframe 1 in FIG. 3. In some embodiments, a second subframe 306 of the radio frame 302 may be designated as a special subframe, for example, subframe 6 may be designated as a special subframe and subframe 7 may be designated as a UL subframe.

In some embodiments, special subframes may be divided into three parts, a DL pilot time slot 308 (DwPTS), a Guard Period (GP) 310, and a UL pilot time slot (UpPTS) 312. The time length of each of these three parts may be varied. In some embodiments, the DwPTS 308 may be used for DL transmission, the GP 310 may provide the necessary time to switch from DL to UL transmission, and the UpPTS 312 may be used to accommodate multiple time advances.

In some embodiments, different frame configurations may be used to set the remaining subframes as DL, UL, or special subframes. Table 1 shows example frame configurations that a radio access network may use. In particular, Table 1 shows some frame configurations available in an LTE network. However, other frame configurations may also be used, both in an LTE network and in other radio access network. In some radio access network, frame configurations may dedicate at least one particular subframe 306 to a particular type of subframe. For example, as shown in Table 1 and reflected in FIG. 3, subframes 0 and 5 may be dedicated to DL transmissions, subframe 2 may be dedicated to UL transmissions, and subframe 1 may be designated as a special subframe. Different frame configurations may be used to change the ratio of DL and UL transmissions communicated to a mobile terminal. By changing the ratio of DL and UL transmissions, the ratio of DL and UL data being received at and transmitted by a mobile terminal respectively may also be changed. For example, as demonstrated in Table 1, UL data may be transmitted at a higher rate using configuration 0 than configuration 5 because more subframes 306 are dedicated to UL transmissions than DL transmissions in configuration 0 than configuration 5.

TABLE 1

| CONFIGURATION NUMBER (LTE) | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Figure 4A:
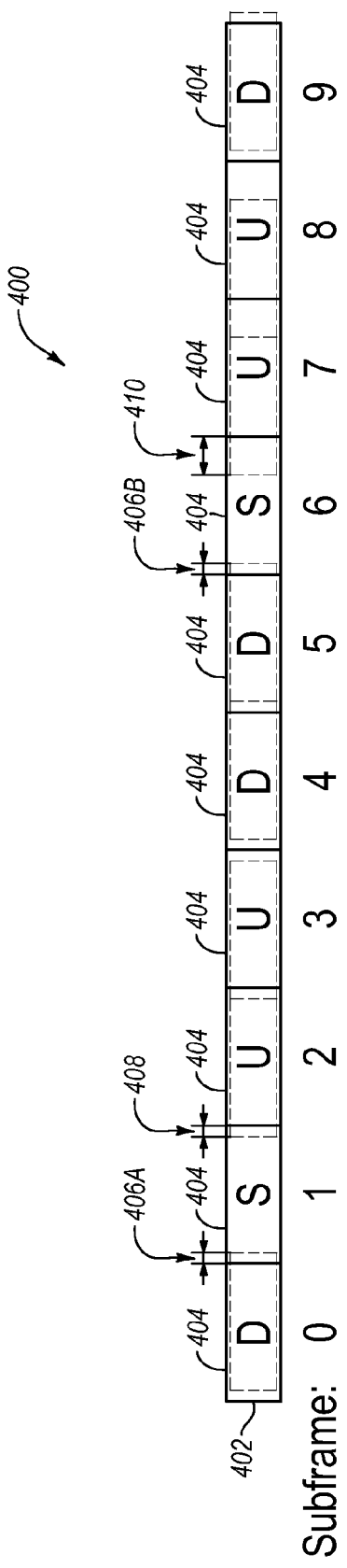
FIG. 4A illustrates an example of a communication protocol that employs UL load balancing in a radio access network.

FIG. 4A illustrates an example of a communication protocol 400 at a mobile terminal that may facilitate UL load balancing in a radio access network, arranged in accordance with at least some embodiments described herein. In particular, the communication protocol 400 may be an example of a UL load balanced communication in a radio access network that occurs between the mobile terminal and a primary base station and a secondary base station. The primary base station, secondary base station and mobile terminal may generally correspond to the primary base station 206, the secondary base station 210, and the mobile terminal 202 of FIG. 2.

The UL load balancing in the communication protocol 400 may occur by the mobile terminal sending some UL transmissions to the primary base station and other UL transmissions to the secondary base station. During UL load balancing, the mobile device may transmit varying amounts or the same amounts of UL transmissions to the primary base station and the secondary base station supported by a communication protocol 400. The communication protocol 400 shown in FIG. 4, illustrates a 1:1 ratio between UL transmissions sent to the primary base station and UL transmissions sent to the secondary base station. In some embodiments, the communication protocol 400 may show multiple time advances, which may indicate that the mobile terminal may have communicated with more than one base station during a targeted protocol duration. The structure of the communication protocol 400 may generally correspond to the communication protocol structure 300 of FIG. 3 and may include a frame 402. The frame 402 may generally correspond to the radio frame 302 of FIG. 3. The frame 402 may be subdivided into subframes 404. In some embodiments, the subframes 404 are assigned identifiers, for example, the subframes may be numbered 0-9. The subframes 404 may include DL subframes, labeled "D", UL subframes, labeled "U" and special subframes, labeled "S". During the DL subframes, DL transmissions to be received at the mobile terminal may be transmitted from the primary base station. Alternately or additionally, the DL transmissions may be transmitted from the secondary base station and/or additional base stations. The frame configuration of the communication protocol 400 as shown in FIG. 4A may correspond with the frame configuration number 1 in Table 1. However, the described concepts may also be used with frame configurations numbered 0, 2, 3, 4, 5 and 6 in Table 1, as well as other frame configurations. In some embodiments, the described concepts may be used in systems employing Frequency Division Duplexing (FDD). FDD may include employing different frequency bands for UL and downlink (DL) and may include the use of a different type of frame structure than shown in FIG. 4A. In some embodiments, the described concepts may be used when sequential frame operation is used for FDD frames UL load balanced between multiple base stations.

An example of UL loading as experienced by the mobile terminal is now explained with respect to FIG. 4A and the communication protocol 400. The primary base station may transmit a DL transmission during subframe 0 to the mobile terminal. Because of propagation delays, the mobile terminal may not receive the DL transmission at the beginning of subframe 0. As a result, the DL transmission sent during subframe 0 may continue into subframe 1 by a length of time approximately equal to a propagation delay 406A between the primary base station and the mobile terminal. The primary base station may schedule a reception window to receive UL transmissions from the mobile terminal during subframes 2 and 3. In some embodiments, the mobile terminal may transmit the UL transmissions ahead of subframes 2 and 3 by a primary time advance value 408 so that the UL transmissions may be received at the primary base station during subframes 2 and 3. In some embodiments, transmitting the UL transmissions ahead so that the UL transmission are received at the primary base station during subframes 2 and 3 may time-align the UL transmission with UL transmissions received at the primary base station from other mobile terminals serviced by the primary base station. As a result of transmitting the UL transmissions of subframes 2 and 3 advanced by a primary time advance 408, the UL transmission of subframe 2 may be partially transmitted by the mobile terminal during subframe 1 and the UL transmission of subframe 3 may be partially transmitted by the mobile terminal during subframe 2. In some embodiments, the UL transmission of subframe 2 may occur in part during an UpPTS portion of subframe 1. In some embodiments, the primary time advance value 408 may be determined by the mobile terminal and may be equal to or approximately equal to the length of the propagation delay between the mobile terminal and the primary base station.

During communication protocol 400, the primary base station may also transmit a DL transmission during subframes 4 and 5. In some embodiments, the reception of the DL transmission of subframe 5 may continue into subframe 6 by a length of time approximately equal to the propagation delay 406B between the primary base station and the mobile terminal.

In some embodiments, the secondary base station may schedule a reception window to receive UL transmissions from the mobile terminal during subframes 7 and 8. In some embodiments, the UL transmissions may be transmitted by the mobile terminal ahead of subframes 7 and 8 by a secondary time advance value 410 so that the UL transmissions may be received at the secondary base station during subframes 7 and 8. As a result of transmitting the UL transmissions of subframes 7 and 8 by a secondary time advance 410, the UL transmission of subframe 7 may be partially transmitted by the mobile terminal during subframe 6 and the UL transmission of subframe 8 may be partially transmitted by the mobile terminal during subframe 7. In some embodiments, the UL transmission of subframe 7 may occur in part during an UpPTS portion of subframe 6. In some embodiments, the secondary time advance value may be equal to or approximately equal to the length of propagation delay between the mobile terminal and the secondary base station.

In some embodiments, the described pattern may be repeated for subsequent frames. In some embodiments, the multiple time advance structure may be repeated until the schedule is updated, for example, in response to UL traffic requirements of the mobile terminal. In some embodiments, other time advance patterns may be employed. For example, UL transmissions may be load balanced between a primary base station and a secondary base station in ratios other than 1:1. For example, UL transmissions may be load balanced between a primary base station and a secondary base station in 2:1, 3:1, 1:2, or 1:3 ratios or other ratios.

In some embodiments, UL transmissions may be load balanced between a primary base station and multiple secondary base stations. In some embodiments, UL transmissions may be load balanced between multiple secondary base stations.

Figure 4B:
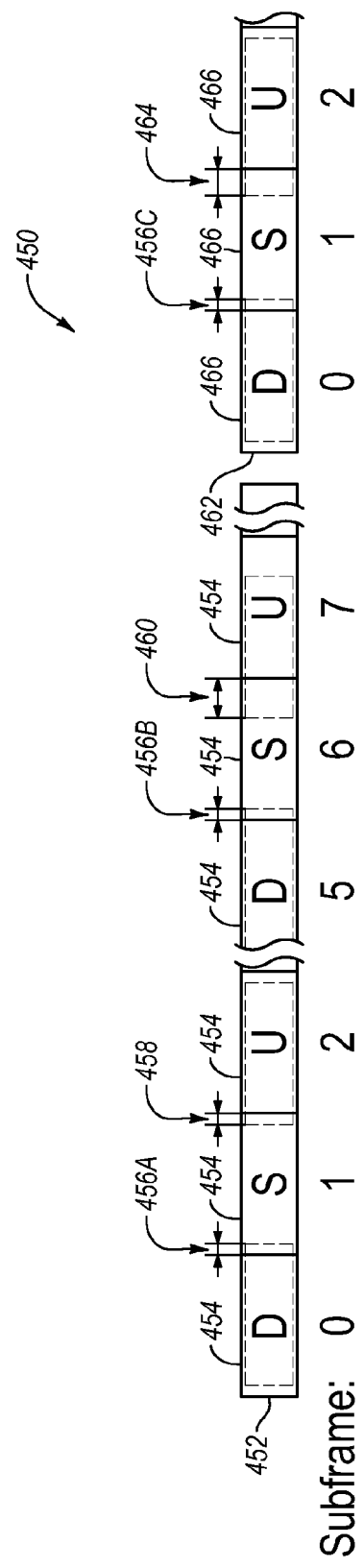
FIG. 4B illustrates another example of a communication protocol that employs UL load balancing in a radio access network.

FIG. 4B illustrates an example of a UL load balanced communication protocol 450 between a primary base station, a secondary base station, and a tertiary base station at a 1:1:1 ratio with multiple time advances, arranged in accordance with at least some embodiments described herein. The frame structure of the communication protocol 450 may generally correspond that of the structure 400 of FIG. 3 and may include a first frame 452 and a second frame 462. First frame 452 may include subframes 454. Second frame 462 may include subframes 466. Some subframes are not described and are omitted from FIG. 4B.

An example of UL loading as experienced by the mobile terminal is now explained with respect to FIG. 4B and the communication protocol 450. The primary base station may transmit a DL transmission during subframe 0 of the first frame 452 to the mobile terminal. The reception of the DL transmission of subframe 0 by the mobile terminal may continue into subframe 1 by a length of time approximately equal to a propagation delay 456A between the primary base station and the mobile terminal.

In some embodiments, the primary base station may schedule a reception window to receive UL transmissions from the mobile terminal during subframe 2 of the first frame 452. The UL transmissions may be transmitted by the mobile terminal ahead of subframe 2 by a primary time advance value 458 so that the UL transmissions may be received at the primary base station during subframe 2. As a result of transmitting the UL transmissions of subframe 2 by a primary time advance 458, the UL transmission of subframe 2 may be partially transmitted by the mobile terminal during subframe 1. In some embodiments, the UL transmission of subframe 2 may occur in part during an UpPTS portion of subframe 1. In some embodiments, the primary time advance value 458 may be received by the mobile terminal from the primary base station. In some embodiments, the primary time advance value 458 may be equal to or approximately equal to the length of propagation delay between the mobile terminal and the primary base station.

During communication protocol 450, the primary base station may also transmit a DL transmission during subframe 5 of the first frame 452 to the mobile terminal. In some embodiments, the reception of the DL transmission of subframe 5 may continue into subframe 6 by a length of time approximately equal to the propagation delay 456B between the primary base station and the mobile terminal.

In some embodiments, the secondary base station may schedule a reception window to receive UL transmissions from the mobile terminal during subframe 7 of the first frame 452. In some embodiments, UL transmissions may be transmitted by the mobile terminal ahead of subframe 7 by a secondary time advance value 460 so that the UL transmissions may be received at the secondary base station during subframe 7. As a result of transmitting the UL transmissions of subframe 7 by a secondary time advance 460, the UL transmission of subframe 7 may be partially transmitted by the mobile terminal during subframe 6. In some embodiments, the UL transmission may occur in part during an UpPTS portion of subframe 6. In some embodiments, the secondary time advance value may be approximately equal to the length of propagation delay between the mobile terminal and the secondary base station.

During communication protocol 450, the primary base station may also transmit a DL transmission during subframe 0 of the second frame 462 to the mobile terminal. In some embodiments, the reception of the DL transmission of subframe 0 may continue into subframe 1 by a length of time approximately equal to the propagation delay 456C between the primary base station and the mobile terminal.

In some embodiments, the tertiary base station may schedule a reception window to receive UL transmissions from the mobile terminal during subframe 2 of the second frame 462. In some embodiments, the UL transmissions may be transmitted by the mobile terminal ahead of subframe 2 by a tertiary time advance value 464 so that the UL transmissions may be received at the tertiary base station during subframe 2. As a result of transmitting the UL transmissions of subframe 2 by a tertiary time advance 464, the UL transmission of subframe 2 may be partially transmitted by the mobile terminal during subframe 1. In some embodiments, the UL transmission may occur in part during an UpPTS portion of subframe 1. In some embodiments, the tertiary time advance value may be approximately equal to the length of propagation delay between the mobile terminal and the tertiary base station.

In some embodiments, the pattern may be repeated. In some embodiments, other frame configurations and/or other load balancing ratios may cause the pattern to include a different number of frames, including portions of frames. In some embodiments, the multiple time advance structure described may be repeated until the schedule is updated, for example, in response to UL traffic requirements of the mobile terminal.

In some embodiments, secondary time advance values, such as time advance values 410, 460, 464 may be determined at the mobile terminal so that communications may be UL load balanced between multiple base stations, for example, as described with relation to FIG. 4A and FIG. 4B.

With reference to FIG. 2, in some embodiments, the secondary time advances may be determined at the mobile terminal when the secondary base station 210 transmits a secondary time advance value to the primary base station 206 over the base station communication interface 212, and the secondary time advance value is then transmitted to the mobile terminal 202 over the primary radio interface 214. In this case, the secondary time advance value may take an indirect path 218 to the mobile terminal.

In other embodiments, the mobile terminal 202 may be configured to receive a primary signal including a primary time advance value transmitted by the primary base station 206. The mobile terminal may be further configured to receive a secondary signal transmitted by the secondary base station 210. The mobile terminal may be further configured to determine a difference in propagation delay between the primary signal and the secondary signal. The mobile terminal may be further configured to determine a secondary time advance value by correlating the primary time advance value with the difference in propagation delay.

In some embodiments, the primary base station 206 and the secondary base station 210 DL transmissions may each include a Primary Synchronization Signal (PSS) and a Secondary Synchronization Signal (SSS). PSS and SSS signals may be transmitted to assist the mobile terminal 202 in finding and synchronizing with base stations within a radio access network, when located within the coverage of the respective base stations. In some embodiments, the PSS and SSS signals may be located in the same location within frames, such as a sequence of radio frame 302 of FIG. 3, of communications between the mobile terminal 202 and the primary and secondary base stations 206, 210. For example, in an example LTE network employing TDD, the primary base station 206 transmissions and the secondary base station 210 transmissions may include the PSS during second and seventh subframes within a frame and the SSS during first and sixth subframes within the same frame. In some embodiments, the physical characteristics of the PSS and SSS signals within each frame may allow the mobile terminal 202 to determine frame timing.

In some embodiments, the over the air transmission timing of the primary base station 206 and the secondary base station 210 may be fully synchronized and thus, the transmission timing of the PSS and SSS portions may be synchronized between the primary base station 206 and the secondary base station 210. For example, the primary base station 206 and the secondary base station 210 may both transmit SSS and/or PSS portions of frames during the same periods of time.

FIGS. 5A and 5B illustrate example timelines 500, 530 for receiving and transmitting transmissions at a mobile terminal, arranged in accordance with at least some embodiments described herein. The mobile terminal described with respect to FIGS. 5A and 5B may generally correspond to the mobile terminal 202 of FIG. 2. In some embodiments, the mobile terminal may synchronize with a primary base station. For example, the mobile terminal may complete random access connection procedures with the primary base station. The primary base station may generally correspond to the primary base station 206 of FIG. 2. The mobile terminal may also associate with a secondary base station by transmitting UL transmission to the secondary base station. The secondary base station may generally correspond to the secondary base station 210 of FIG. 2. In some embodiments, the mobile terminal may not complete random access connection procedures with the secondary base station.

In some embodiments, DL transmissions transmitted by the primary base station and the secondary base station to the mobile terminal may be received at the mobile terminal over time diagram 502. The primary base station and the secondary base station may each transmit a time reference of a DL transmission at the same time 504. In some embodiments, the time references may be a start of a frame, such the radio frame 302 of FIG. 3, of a communication between each of the primary and secondary base stations and the mobile terminal. In some embodiments, the mobile terminal, after processing the PSS and SSS information, may blindly decode the Physical Broadcast Channel (PBCCH) in order to decode the network and cell identifications.

Although the time references may be transmitted by the primary base station and the secondary base station at the same time 504, the time reference of the DL transmission from the primary base station may be received at the mobile terminal at a first time 506 ($T_P^{DL}$) and the time reference of the DL transmission from the secondary base station may be received at the mobile terminal at a second time 508 ($T_S^{DL}$) due to a difference in propagation delay between the mobile terminal and the primary and secondary base stations. In some embodiments, the difference in propagation delay 510 ($\Delta T$) may be determined by the following formula:

$$\Delta T = T_S^{DL} - T_P^{DL}$$

Thus, in some embodiments, a difference in propagation delay may be determined by the mobile terminal from signals received from the primary base station and the secondary base station. For example, the difference in propagation delay may be determined from known features of the signals. As a result, in some embodiments, the difference in propagation delay may be determined by the mobile terminal without completing the network entry process for the secondary base station, though without being effectively connected to the second base station.

As shown in FIG. 5B, in some embodiments, UL transmissions to be received by the primary and secondary base stations may be transmitted by the mobile terminal over time line 512. In particular, the mobile terminal may transmit the UL transmissions to the primary and secondary base stations so that the UL transmissions are received at time reference 514. Time reference 514 may correspond with a start of a scheduled receiving window for both the primary and secondary base stations. In some embodiments, time reference 514 may be measured on the antenna interfaces of the primary and secondary base stations. In some embodiments, the mobile terminal may transmit the UL transmission to the primary base station at time reference 516 before time reference 514 (time referenced to the antenna port of the primary base station) to compensate for the propagation delay encountered when transmitting the UL transmission to the primary base station. The time difference between time references 514 and 516 may be equal to a first time advance value 517 ($T_P^{UL}$). In some embodiments, the first time advance value 517 ($T_P^{UL}$) may be transmitted to the mobile terminal from the primary base station.

In some embodiments, the mobile terminal may transmit the UL transmission to the secondary base station at time reference 518 (time referenced to the antenna port of the secondary base station) before time reference 514 to compensate for the propagation delay encountered when transmitting the UL transmission to the secondary base station. The time difference between time reference 514 and reference 518 may be equal to a second time advance value 519 ($T_S^{UL}$). In some embodiments, the second time advance value 519 ($T_S^{UL}$) may be determined by the following formula:

$$T_S^{UL} = T_P^{UL} + \Delta T$$

where $\Delta T$ is the difference in propagation delay 510 between signals received from the primary and secondary base stations. Thus, in some embodiments, the second time advance value 519 ($T_S^{UL}$) may be determined for the secondary base station without mobile terminal completing the network entry process for the secondary base station or the mobile terminal receiving the second time advance value 519 ($T_S^{UL}$) from the secondary base station directly or indirectly through the primary base station.

In some embodiments, the primary base station may provide the mobile terminal with scheduling information for UL transmissions related to the primary base station. For example, the primary base station may provide the mobile terminal with receiving window schedules, UL load balancing ratios, and the like. With the scheduling information, the mobile terminal may transmit UL transmissions properly time advanced for the base station scheduled to receive the UL transmission. For example, UL load balanced transmissions may be performed as described with relation to FIGS. 4A and 4B.

In some embodiments, the second time advance value 519 may be regularly updated through regularly monitoring transmissions from the secondary base station. For example, in some embodiments, the second time advance value 519 may be updated by blindly detecting and decoding the PSS/SSS of transmissions from the secondary base station with a given rate, which may be every 5 milliseconds or some other period of time.

In some embodiments, additional time advance values associated with additional base stations may be determined in the same manner. For example, a secondary propagation delay may be determined based on the differences between the time a signal from a tertiary base station is received at the mobile terminal and the time a signal from the primary base station is received at the mobile terminal. The secondary propagation delay may be combined with the first time advance value 517 to determine a third time advance value for advancing UL transmissions to be received by the second secondary base station.

Advantages of the embodiments described herein may include transmitting UL transmissions to a primary base station and a secondary base station as regularly as within a single frame or every other half-frame within a TDD based radio access network, depending on the frame configuration. Advantages may further include the mobile terminal determining a secondary time advance value so that the mobile terminal is neither required to connect to a secondary base station nor use the Physical Random Access Channel of the secondary base station. For example, the secondary time advance value may not be sent from the secondary base station to the mobile terminal by way of a base station communication interface and the primary base station. Determining the secondary time advance value instead of receiving the secondary time advance value by way of the primary base station may result in a net processing time gain of 8 to 12 milliseconds or even more depending on the implementation of the radio access network. Additionally or alternately, determining the secondary time advance value in place of receiving the secondary time advance value may decrease variable latency caused by jitter. Additionally or alternately, determining the secondary time advance value in place of receiving the secondary time advance value from the secondary base station may avoid multiple blind decodings of transmissions from the secondary base station thereby optimize physical processing and power consumption of the mobile terminal.

Advantages of the embodiments described herein may also include providing a reasonable physical implementation for multiple time advances without significantly increasing the mobile terminal complexity or power consumption. Further advantageous may include enabling UL load balancing in heterogeneous TDD networks by allowing the mobile terminal to upload data cooperatively to a smaller neighboring cell. Further advantages may include avoiding using a Physical Random Access Preamble Channel (PRACH) of the secondary base station that may result in oversizing the PRACH of the secondary base station due to mobile terminals primary connected to other base stations.

Figure 6:
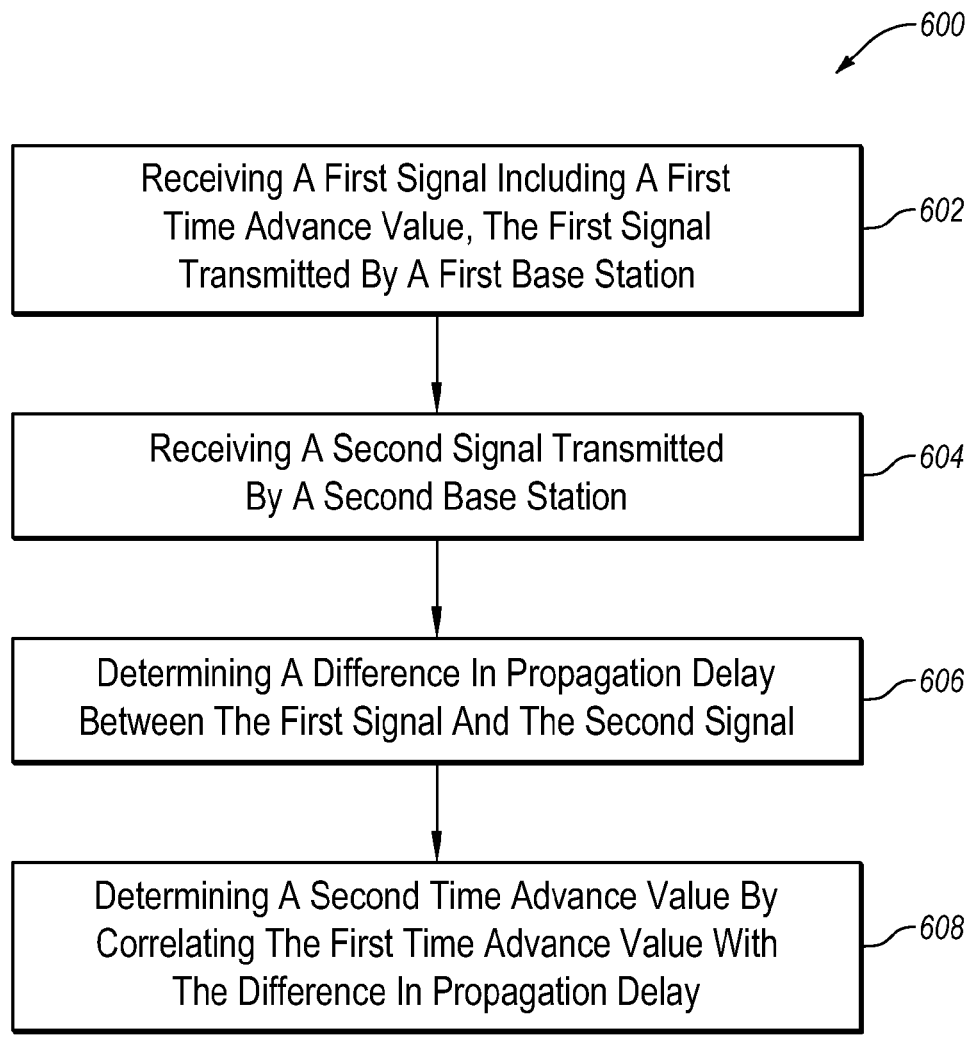
FIG. 6 illustrates an example flow chart for determining secondary time advance values in a radio access network.

FIG. 6 is a flowchart of an example method 600 of determining secondary time advance values in a telecommunication system, arranged in accordance with at least some embodiments described herein. The method 600 may be implemented, in some embodiments, by a mobile telecommunication system 100 of FIG. 1 and, in particular, a mobile terminal within the mobile telecommunication system, such as the mobile terminal 106. In some embodiments, a physical layer of the mobile terminal 106 of the telecommunication system 100 of FIG. 1 may perform operations for determining secondary time advance values in the mobile telecommunication system 100 as represented by one or more of blocks 602, 604, 606, and/or 608 of the method 600. Alternately or additionally, a processor within the mobile terminal 106 of the mobile telecommunications system 100 of FIG. 1 may be configured to execute computer instructions to cause the mobile terminal 106 to perform operations for determining secondary time advance values in the mobile telecommunication system 100 as represented by one or more of blocks 602, 604, 606, and/or 608 of the method 600. In some embodiments, hardware implementations of the method 600, within the physical layer of a mobile terminal or other locations, may be executed faster than implementations of the method 600 performed using a processor within the mobile terminal. Although illustrated as discrete blocks, various blocks may be divided into additional blocks, combined into fewer blocks, or eliminated, depending on the desired implementation.

The method 600 may begin at block 602, in which a first signal may be received. In some embodiments, the first signal may be received at a mobile terminal. The first signal may include a first time advance signal and may be transmitted by a first base station. In block 604, a second signal may be received. In some embodiments, the second signal may be received at the mobile terminal. The second signal may be transmitted by a second base station. In some embodiments, the mobile terminal may be connected with only the first base station. Alternately or additionally, the second signal may not include time advance information. Alternately or additionally, the first signal may not include time advance information from the second base station.

In block 606, a difference in propagation delay between the first signal and the second signal may be determined. In some embodiments, the difference in propagation delay may be determined using synchronization signals included in the first signal and the second signal, for example, by using the synchronization signals included in the first signal and the second signal to determine time references in the first and second signals. In some embodiments, the difference in propagation delay between the first and second signals may be determined by calculating the difference of the time references in the first and second signals. In some embodiments, the synchronization signals included in the first signal and the second signal may include primary and secondary synchronization signals.

In block 608, a second time advance value may be determined by correlating the first time advance value with the difference in propagation delay between the first and second signals.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 600 may further include transmitting a packet communication. In some embodiments, the packet communication may include a first transmission to be received at the first base station during a first receiving window and a second transmission to be received at the second base station during a second receiving window. In some embodiments, transmitting the packet communication may include transmitting the first transmission ahead of the first receiving window by the first time advance value such that the first transmission is received at the first base station during the first receiving window. Additionally or alternately, transmitting the packet communication may include transmitting the second transmission ahead of the second receiving window by the second time advance value such that the second transmission is received at the second base station during the second receiving window.

Additionally, the method 600 may further include receiving a third signal transmitted by a third base station. In some embodiments, a difference in propagation delay between the first signal and the third signal may be determined. In some embodiments, a third time advance value may be determined by correlating the first time advance value with the difference in propagation delay between the first signal and the third signal. In some embodiments, the method 600 may further include transmitting a communication including a third transmission to be received at the third base station during a third receiving window. In some embodiments, transmitting the communication may include transmitting the third transmission ahead of the third receiving window by the third time advance value such that the third transmission is received at the third base station during the third receiving window.

Figure 7:
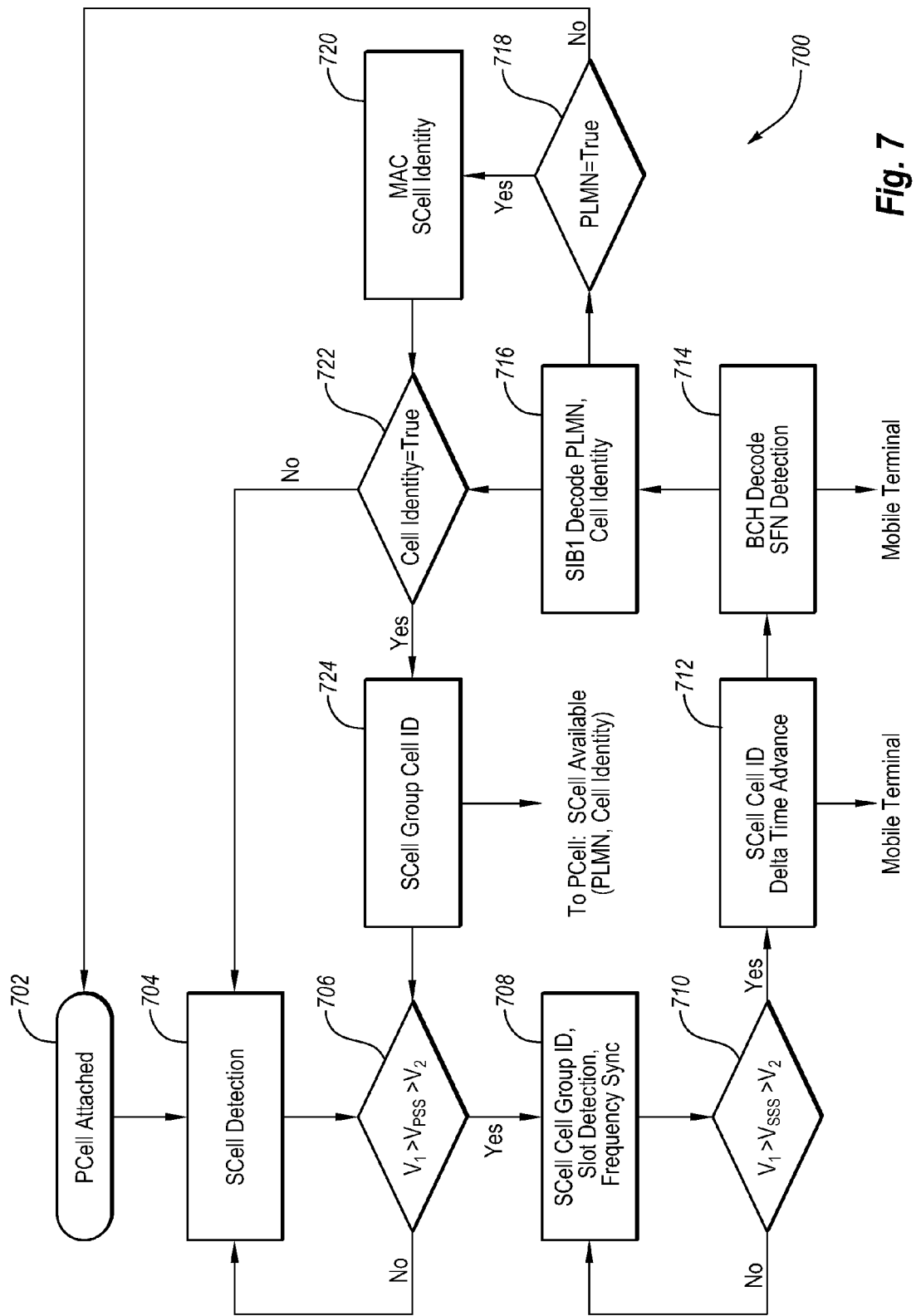
FIG. 7 illustrates an example flow chart describing an algorithm for identifying secondary base stations for UL load balancing in a radio access network, all arranged in accordance with at least some embodiments described herein.

FIG. 7 is a flowchart of an example algorithm 700 for identifying secondary base stations for UL load balancing in a radio access network, arranged in accordance with at least some embodiments described herein. The method 700 may be implemented, in some embodiments, by a mobile telecommunication system 200 of FIG. 2 and, in particular, a mobile terminal within the mobile telecommunication system, such as the mobile terminal 206. The mobile terminal may implement the method 700 using hardware of the mobile terminal. For example, the mobile terminal may implement the method 700 in the physical layer of the mobile terminal. In some embodiments, hardware implementations of the method may be faster than implementations performed using computer executable instructions. Although FIG. 7 is illustrated as discrete blocks, various blocks may be divided into additional blocks, combined into fewer blocks, or eliminated, depending on the desired implementation.

The method 700 may begin at block 702, in which, the mobile terminal may be attached to a primary base station associated with a primary cell (PCell). For example, the mobile terminal may have completed random access with the primary base station. The primary base station and the primary cell may generally correspond to the primary base station 206 and the primary cell 204 of FIG. 2.

In block 704, the mobile terminal may begin detecting secondary base stations associated with potential secondary cells (SCell). The potential secondary base stations may generally correspond to the secondary base station 210 and/or the tertiary base station 222 of FIG. 2; however, other potential secondary base stations may be detected by the mobile terminal. In some embodiments, the mobile terminal may begin detecting the potential secondary base stations in response to risks that the primary base station may become overloaded. In some embodiments, the mobile terminal may automatically begin detecting the potential secondary base stations.

In block 706, the quality of a PSS signal of one potential secondary base station may be compared to the quality of the primary base station's signal and the quality of other potential secondary base stations. For example, in some embodiments, the PSS portions of the signals transmitted from potential secondary base stations may be detected and decoded. In these and other embodiments, the voltage of the processed potential secondary base station's PSS signal ($V_{PSS}$) may be compared to the voltage of an upper preset threshold ($V_1$) and the voltage of a lower preset threshold ($V_2$). In some embodiments, if the voltage of the potential secondary base station's PSS signal is outside the preset comparator window, the signal may be considered not suitable and the method may return to block 704 and the suitability of another potential secondary base station's PSS signal may be analyzed. When a potential secondary base station's signal is within the preset comparator window, the method may continue to block 708.

During the processing described by block 708, the mobile terminal may detect a secondary base station's PSS signal in order to determine slot timing, execute frequency synchronization, and to derive the secondary base station's Cell Group ID. Should these be executed, the mobile terminal may also detect the secondary base station's SSS signal.

In block 710, the quality of the SSS signal may be compared against a preset window. For example, the detected voltage of the potential secondary base station's SSS signal ($V_{SSS}$) may be compared against a preset minimal voltage and a preset maximal voltage. In some embodiments, if the voltage of the potential secondary base station's SSS signal is within the comparator window, the method may continue to block 712.

In block 712, the mobile terminal may use the secondary base station's SSS signal to derive the secondary base station's Cell ID. The mobile terminal may also determine a Delta Time Advance using the PSS and/or SSS. The Delta Time Advance may be equal to or approximately equal to the difference in propagation delay for transmissions between the mobile terminal and the primary base station and transmissions between the mobile terminal and the secondary base station. Detecting the difference in propagation delay for the secondary base station may generally correspond to detecting the difference in propagation delay as described with relation to FIGS. 5A and 5B. In some embodiments, the difference in propagation delay for the secondary base station may be determined without engaging the secondary base station. For example, the mobile terminal may derive the difference in propagation delay using signals broadcast by the secondary base station and not from signals specifically transmitted to the mobile terminal. The Cell Group ID and Cell ID information, the Delta Time Advance, and the frequency information may all be stored at the mobile terminal. In some embodiments, the Delta Time Advance may be used by the mobile terminal to facilitate UL load balanced transmissions between the primary base station and the secondary base station. For example, the Delta Time Advance may be used to calculate a secondary time advance as described with relation to FIG. 5B and may further be used to transmit transmissions with multiple time advances as described with relation to FIGS. 4A and 4B.

In block 714, the mobile terminal may further decode the Broadcast Control Channel (BCH) of the signal from the secondary base station to determine System Frame Number (SFN) information of the secondary base station. The SFN information may be stored at the mobile terminal.

In block 716, the mobile terminal may further decode the System-Information Block 1 (SIB1) of the signal from the secondary base station to determine the Public Land Mobile Network (PLMN) identification and the Cell Identity of the secondary base station, following the detection and processing of the Broadcast Channel related to the secondary base station, as indicated in block 714. In block 718, the mobile terminal may determine whether the secondary base station may belong to a different PLMN (carrier) than the primary base station. Carriers may offer their subscribers wireless based services on the carrier's own network and/or the ability to roam on other carrier's networks. For example, providers of cell phone subscriptions. In some embodiments, if the secondary base station has a different PLMN than the primary base stations, then it will consider that the secondary base station belongs to a different carrier, then the entire secondary base station detection process may start over at block 702 or block 704. If the PLMN belongs to the same carrier, a neighboring secondary base station list provided by the primary base station may be checked against the secondary base station's Cell Identity in block 722. In some embodiments, if the Cell Identity does not match an entry included in the neighboring secondary base station list, the method may return to block 704 to continue detecting neighboring secondary base stations. If the secondary base station's Cell Identity matches an entry included in the neighboring secondary base station list, the method may continue to block 724.

In block 724, the mobile terminal may provide the Cell Identity of the secondary base station and any other desired information to the primary base station to indicate the availability of the secondary base station for UL load balancing. In some embodiments, the method 700 may continue to block 706 and perform the PSS signal quality check to update the availability of the identified secondary base station or to identify additional available secondary base stations. When the primary cell has received information about the availability of one or more secondary cells, a UL load balance may be scheduled and performed according to the embodiments described herein.

Although the embodiments described herein may preferably include performing the method through hardware implementations, the embodiments described herein may also include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable media including Random Access Memory (RAM), Read-Only Memory (ROM), Electrically Erasable Programmable Read-Only Memory (EEPROM), Compact Disk Read-Only Memory (CD-ROM) or other optical disk storage, magnetic disk storage or other magnetic storage devices, or any other medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain operation or group of operations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system comprising a mobile terminal configured to:
  receive a first time advance value associated with a first base station;
  detect a secondary synchronization signal transmitted by a second base station, and, in response to determining that a voltage of the secondary synchronization signal is within a preset window, deriving a cell identity of the second base station from a system-information block transmitted by the second base station;
  communicate to the first base station an availability message indicating that the second base station is capable of receiving transmissions from the mobile terminal, the availability message including the cell identity of the second base station determined from the system-information block;
  receive a first signal transmitted by the first base station, the first signal including a first time reference;
  receive a second signal transmitted by the second base station, the second signal including a second time reference, the second time reference transmitted by the second base station and the first time reference transmitted by the first base station at a same transmission time;
  receive the first time reference of the first signal at a first reception time;
  receive the second time reference of the second signal at a second reception time;
  determine a first propagation delay difference between the first signal and the second signal based on the first reception time of the first time reference of the first signal and the second reception time of the second time reference of the second signal; and
  determine a second time advance value related to the second base station by correlating the first time advance value related to the first base station with the first propagation delay difference, the second time advance value including a measure of time in a special subframe of a communication protocol structure during which the mobile terminal is configured to advance an uplink transmission sent to the second base station.

2. The system of claim 1, wherein the mobile terminal is further configured to communicate with a Long Term Evolution (LTE) network, the LTE network including:

the first base station comprising a first Evolved NodeB (eNodeB); and
the second base station comprising a second eNodeB.

3. The system of claim 1, wherein the mobile terminal is further configured to:
transmit a communication, the communication including:
a first transmission to be received at the first base station during a first receiving window; and
a second transmission to be received at the second base station during a second receiving window;
wherein transmitting the communication includes:
transmitting the first transmission ahead of the first receiving window by the first time advance value such that the first transmission is received at the first base station during the first receiving window; and
transmitting the second transmission ahead of the second receiving window by the second time advance value such that the second transmission is received at the second base station during the second receiving window.

4. The system of claim 1, wherein the mobile terminal is further configured to:
receive a third signal transmitted by a third base station, the third signal including a third time reference received at a third reception time, the third time reference transmitted by the third base station at the transmission time;
determine a second propagation delay difference between the first signal and the third signal based on the first reception time and the third reception time; and
determine a third time advance value by correlating the first time advance value with the second propagation delay difference.

5. The system of claim 4, wherein the mobile terminal is further configured to:
transmit a communication, the communication including:
a first transmission to be received at the first base station during a first receiving window;
a second transmission to be received at the second base station during a second receiving window; and
a third transmission to be received at the third base station during a third receiving window;
wherein transmitting the communication includes:
transmitting the first transmission ahead of the first receiving window by the first time advance value such that the first transmission is received at the first base station during the first receiving window;
transmitting the second transmission ahead of the second receiving window by the second time advance value such that the second transmission is received at the second base station during the second receiving window; and
transmitting the third transmission ahead of the third receiving window by the third time advance value such that the third transmission is received at the third base station during the third receiving window.

6. The system of claim 1, wherein determining the first propagation delay difference includes:
determining the first time reference of the first signal via a first synchronization signal of the first signal; and
determining the second time reference of the second signal via a second synchronization signal of the second signal.

7. The system of claim 6, wherein:
the first synchronization signal includes a first primary synchronization signal and a first secondary synchronization signal; and
the second synchronization signal includes a second primary synchronization signal and a second secondary synchronization signal.

8. The system of claim 1, wherein the mobile terminal is configured to determine the first propagation delay difference and correlate the first time advance value with the first propagation delay difference in a physical layer of the mobile terminal.

9. The system of claim 1, wherein the second time advance is determined with the mobile terminal connected solely with the first base station and the first signal includes information only about the first base station.

10. A method of determining time advance values, the method comprising:
receiving a first time advance value at a mobile terminal, the first time advance value associated with a first base station;
receiving, at the mobile terminal, a secondary synchronization signal from a second base station, and, in response to determining that a voltage of the secondary synchronization signal is within a preset window, deriving a cell identity of the second base station from a system information block transmitted by the second base station;
communicating to the first base station an availability message indicating that the second base station is capable of receiving transmissions from the mobile terminal, the availability message including the cell identity of the second base station determined from the system-information block;
receiving, at the mobile terminal, a first signal transmitted by the first base station, the first signal including a first time reference;
receiving, at the mobile terminal, a second signal transmitted by the second base station, the second signal including a second time reference, the second time reference transmitted by the second base station and the first time reference transmitted by the first base station at a same transmission time;
receiving, at the mobile terminal, the first time reference of the first signal at a first reception time;
receiving, at the mobile terminal, the second time reference of the second signal at a second reception time;
determining a first propagation delay difference between the first signal and the second signal based on the first reception time of the first time reference of the first signal and the second reception time of the second time reference of the second signal; and
determining a second time advance value related to the second base station by correlating the first time advance value related to the first base station with the first propagation delay difference, the second time advance value including a measure of time in a special subframe of a communication protocol structure during which the mobile terminal is configured to advance an uplink transmission sent to the second base station.

11. The method of claim 10, further comprising:
transmitting a communication from the mobile terminal, the communication including:
a first transmission to be received at the first base station during a first receiving window; and
a second transmission to be received at the second base station during a second receiving window;
wherein transmitting the communication from the mobile terminal includes:
transmitting the first transmission ahead of the first receiving window by the first time advance value such that the first transmission is received at the first base station during the first receiving window; and
transmitting the second transmission ahead of the second receiving window by the second time advance value such that the second transmission is received at the second base station during the second receiving window.

12. The method of claim 10, further comprising:
receiving, at the mobile terminal, a third signal transmitted by a third base station, the third signal including a third time reference received at the mobile terminal at a third reception time, the third time reference transmitted by the third base station at the transmission time;
determining a second propagation delay difference between the first signal and the third signal based on the first reception time and the third reception time; and
determining a third time advance value by correlating the first time advance value with the second propagation delay difference.

13. The method of claim 10, wherein determining the first propagation delay difference includes:
determining the first time reference of the first signal via a first synchronization signal of the first signal; and
determining the second time reference of the second signal via a second synchronization signal of the second signal.

14. The method of claim 13, wherein:
the first synchronization signal includes a first primary synchronization signal and a first secondary synchronization signal; and
the second synchronization signal includes a second primary synchronization signal and a second secondary synchronization signal.

15. The method of claim 10, wherein the mobile terminal is connected only with the first base station.

16. The method of claim 10, wherein the determining the first propagation delay difference and the determining the second time advance value are performed in a physical layer of the mobile terminal.

17. A processor configured to execute computer instructions to cause a system to perform operations for determining secondary time advance values in a telecommunication system, the operations comprising:
receiving a first time advance value associated with a first base station;
detecting a secondary synchronization signal transmitted by a second base station, and, in response to determining that a voltage of the secondary synchronization signal is within a preset window, deriving a cell identity of the second base station from a system-information block transmitted by the second base station;
communicating to the first base station an availability message indicating that the second base station is capable of receiving transmissions from the mobile terminal, the availability message including the cell identity of the second base station determined from the system-information block;
receiving a first signal transmitted by the first base station, the first signal including a first time reference;
receiving a second signal transmitted by the second base station, the second signal including a second time reference, the second time reference transmitted by the second base station and the first time reference transmitted by the first base station at a same transmission time;
receiving the first time reference of the first signal at a first reception time;
receiving the second time reference of the second signal at a second reception time;
determining a first propagation delay difference between the first signal and the second signal based on the first reception time of the first time reference of the first signal and the second reception time of the second time reference of the second signal; and
determining a second time advance value related to the second base station by correlating the first time advance value related to the first base station with the first propagation delay difference, the second time advance value including a measure of time in a special subframe of a communication protocol structure during which a mobile terminal is configured to advance an uplink transmission sent to the second base station.

18. The processor of claim 17, the operations further comprising:
transmitting a communication, the communication including:
a first transmission to be received at the first base station during a first receiving window; and
a second transmission to be received at the second base station during a second receiving window;
wherein transmitting the communication includes:
transmitting the first transmission ahead of the first receiving window by the first time advance value such that the first transmission is received at the first base station during the first receiving window; and
transmitting the second transmission ahead of the second receiving window by the second time advance value such that the second transmission is received at the second base station during the second receiving window.

19. The processor of claim 17, wherein determining the first propagation delay difference includes:
determining the first time reference of the first signal via a first synchronization signal of the first signal; and
determining the second time reference of the second signal via a second synchronization signal of the second signal.

20. The processor of claim 19, wherein:
the first synchronization signal includes a first primary synchronization signal and a first secondary synchronization signal; and
the second synchronization signal includes a second primary synchronization signal and a second secondary synchronization signal.

* * * * *